United States Patent
Bocchieri et al.

(10) Patent No.: US 9,754,587 B2
(45) Date of Patent: *Sep. 5, 2017

(54) SYSTEM AND METHOD OF USING NEURAL TRANSFORMS OF ROBUST AUDIO FEATURES FOR SPEECH PROCESSING

(71) Applicant: Nuance Communications, Inc., Burlington, MA (US)

(72) Inventors: Enrico Luigi Bocchieri, Chatham, NJ (US); Dimitrios Dimitriadis, Rutherford, NJ (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,000

(22) Filed: Feb. 29, 2016

(65) Prior Publication Data

US 2016/0180843 A1    Jun. 23, 2016

Related U.S. Application Data

(63) Continuation of application No. 14/046,393, filed on Oct. 4, 2013, now Pat. No. 9,280,968.

(51) Int. Cl.
| | |
|---|---|
| *G10L 15/16* | (2006.01) |
| *G10L 21/02* | (2013.01) |
| *G10L 19/00* | (2013.01) |
| *G10L 15/20* | (2006.01) |
| *G10L 15/02* | (2006.01) |

(Continued)

(52) U.S. Cl.
CPC .............. *G10L 15/20* (2013.01); *G10L 15/02* (2013.01); *G10L 15/144* (2013.01); *G10L 25/15* (2013.01); *G10L 25/24* (2013.01); *G10L 15/142* (2013.01); *G10L 15/16* (2013.01); *G10L 21/0208* (2013.01)

(58) Field of Classification Search
None
See application file for complete search history.

(56) References Cited

U.S. PATENT DOCUMENTS

| | | |
|---|---|---|
| 5,745,874 A | 4/1998 | Neely |
| 6,003,003 A | 12/1999 | Asghar et al. |

(Continued)

FOREIGN PATENT DOCUMENTS

| | | |
|---|---|---|
| DE | 19813061 | 9/1999 |

OTHER PUBLICATIONS

E. Bocchieri, "Investigating Deep Neural Network Based Transforms of Robust Audio Feature fo LVCSR," ATT Research http://www.research.att.com/techdocs/TD_101046.pdf.

(Continued)

*Primary Examiner* — Satwant Singh

(57) ABSTRACT

A system and method for processing speech includes receiving a first information stream associated with speech, the first information stream comprising micro-modulation features and receiving a second information stream associated with the speech, the second information stream comprising features. The method includes combining, via a non-linear multilayer perceptron, the first information stream and the second information stream to yield a third information stream. The system performs automatic speech recognition on the third information stream. The third information stream can also be used for training HMMs.

17 Claims, 5 Drawing Sheets

(51) Int. Cl.
*G10L 25/15* (2013.01)
*G10L 25/24* (2013.01)
*G10L 21/0208* (2013.01)
*G10L 15/14* (2006.01)

(56) References Cited

U.S. PATENT DOCUMENTS

| | | | |
|---|---|---|---|
| 6,463,413 B1 | 10/2002 | Applebaum et al. | |
| 6,493,668 B1* | 12/2002 | Brandman | G10L 15/02 704/205 |
| 6,496,795 B1 | 12/2002 | Malvar | |
| 7,013,274 B2* | 3/2006 | Brandman | G10L 15/02 704/205 |
| 7,035,797 B2* | 4/2006 | Iso-Sipila | G10L 15/02 704/227 |
| 7,203,643 B2 | 4/2007 | Garudadri | |
| 7,212,965 B2 | 5/2007 | Dupont | |
| 7,664,642 B2 | 2/2010 | Espy-Wilson et al. | |
| 7,941,313 B2* | 5/2011 | Garudadri | G10L 15/30 704/208 |
| 8,050,911 B2 | 11/2011 | Garudadri | |
| 8,214,214 B2* | 7/2012 | Bennett | G10L 17/26 704/254 |
| 2003/0004720 A1 | 1/2003 | Garudadri et al. | |
| 2006/0122834 A1* | 6/2006 | Bennett | G10L 15/1822 704/256 |
| 2010/0100382 A1 | 4/2010 | Rao et al. | |
| 2011/0153326 A1 | 6/2011 | Garudadri et al. | |
| 2013/0166279 A1 | 6/2013 | Dines et al. | |
| 2014/0214676 A1 | 7/2014 | Bukai | |
| 2014/0222430 A1 | 8/2014 | Rao | |

OTHER PUBLICATIONS

Scharenborg, O. et al., "Capturing Fine-Phonetic Variation in Speech Through Automatic Classification of Articulatory Features," Proceedings of the Workshop on Speech Recognition and Intrinsic Variation, 2006.

Scharenborg, O. et al., "Towards Capturing Fine Phonetic variation in speech using articulatory features," Speech Communication, 2007.

K.K. Paliwal, "Spectral subband centroid features for speech recognition," in *Proc. ICASSP*, Seattle, WA, May 1998, pp. 617-620.

Cha-Ping Chen and J.A. Bilmes, "MVA Processing of Speech Features," *IEEE Trans. on Audio, Speech and Lang. Proc.* vol. 15, No. 1, Jan. 2007.

H. Hermansky and N. Morgan, "RASTA Processing of Speech," *IEEE Trans. on Speech and Audio Processing*, vol. 2, No. 4, Oct. 1994.

G. Saon, M. Padmanabhan, R. Gopinath, and S. Chen, "Maximum likelihood discriminat feature spaces," in *Proc. ICASSP-2000*, pp. 1129-1132.

N. Kumar and G. Andreou, "Heteroscedastic discriminant analysis and reduced rank HMMs for improved speech recognition," *Speech Communication*, vol. 26, pp. 283-297, 1998.

R.A. Gopinath, "Maximum likelihood modeling with Gaussian distribution for classification," in *Proc. ICASSP*, 1998, pp. 661-664.

M.J.F. Gales, "Maximum likelihood linear transformations for HMM-based speech recognition," *Tech Rep. CUED/FINFENG/TR291*, Cambridge Univ., 1997.

M. Saraclar, M. Riley, E. Bocchieri, and V. Goffin, "Towards automatic closed captioning: low latency real time broadcast news transcriptions," in *Proc. International Conference on Spoken Language Processing (ICSLP)*, Sep. 2002, pp. 741-744.

S.B. Davis, P. Mermelstein, "Comparison of parametric representation for monosyllabic word recognition in continuously spoken senetences," *IEEE Trans. on Acoustic, Speech and Signal Processing*, 28(4):357-366, 1980.

H. Hermansky, "Perceptual linear predictive (PLP) analysis of speech," *J. of Acoust. Soc. of America*, vol. 87, No. 4, pp. 1738-1752, 1990.

H. Hermansky, D. Ellis, and S. Sharma, "Tandem connectionist feature stream extraction for conventional HMM systems," in *Proc. of ICASSP-2000*, Istanbul, Jun. 2000.

F. Gre'zl, M. Karafia't, S. Konta'r and J. C"ernocky, "Probabilistic and bottle-neck features for ASR of meetings," in *Proc. of ICASSP-2007*, pp. 757-760.

P. Fousek, L. Lamel and J. Gauvain, "Transcribing broadcast data using MLP features," in *Proc. Interspeech 2008*, pp. 1433-1436.

D. Yu and M.L. Seltzer, "Improved Bottleneck Features Using Pretrained Deep Neural Networks," in *Proc. Interspeech 2011*, pp. 237-240.

T.N. Sainath, B. Kingsbury and B. Ramabhadran, "Auto-encoder bottleneck features using deep belief networks," in *Proc. of ICASSP-2012*.

Z. Tüske, R. Schlüter, H. Ney, M. Sundermeyer, "Context-Dependent MLPs for LVCSR: TANDEM, Hybrid or Both?" *Proc. INTERSPEECH 2012*, Portland, Oregon.

W. Xu, "Towards Optimal One Pass Large Scale Learning with Averaged Stochastic Gradient Descent," last revised Dec. 22, 2011, arxiv.org/abs/1107.2490.

L. Bottou, "Large-Scale Machine Learning with Stochastic Gradient Descent," Proceedings of the 19th International Conference on Computational Statistics (COMPSTAT'2010), 177-187, Edited by Yves Lechevallier and Gilbert Saporta, Paris, France, Aug. 2010, Springer.

M. Riedmiller and H. Braun, "A direct adaptive method for faster backpropagation learning, the RPROP algorithm," in Proc. IEEE International Conference on Neural Networks, 1993, pp. 586-591.

C. Igel and M. Husken, "Improving the Rprop Learning Algorithm," in *Proc. of the Second International Symposium on Neural Computation* (NC2000).

D. Dimitriadis, P. Maragos, and A. Potamianos, "Robust AM-FM Features for Speech Recognition," *IEEE Signal Processing Letters*, vol. 12, No. 9, Sep. 2005.

A. Potamianos and P. Maragos, "Speech formant frequency and bandwidth tracking using multiband energy demodulation," *J. Acoust. Soc. Amer.*, vol. 99, No. 6, pp. 3795-3806, Jun. 1996.

E. Bocchieri, D. Caseiro, and D. Dimitriadis, "Speech recognition modeling advances for mobile voice search," in Proc. ICASSP, 2011, pp. 4888-4891.

D. Dimitriadis, E. Bocchieri, and D. Caseiro, "An alternative front-end for the AT&T Watson LV-CSR system," in *Proc. ICASSP*, 2011.

* cited by examiner

| FRONTEND | NOV93-H1 | NOV93-H2 |
|---|---|---|
| $HDA_{WSJ}$ - MFCC (MFCC BASELINE): | 86.6% | 94.0% |
| HDA - MFCC: | 87.2% | 94.3% |
| $HDA_{WSJ}$ - PLP: (PLP BASELINE) | 86.8% | 93.8% |
| $MLP_{iRPROP}$ - MFCC: | 87.0% | 94.8% |
| MLP - MFCC: | 88.4% | 95.1% |
| MLP - PLP: | 87.9% | 94.6% |
| MLP - PLP+IFMean | 88.6% | 95.1% |

| FRONTEND | WORD ACCURACY | REL. WER REDUCTION |
|---|---|---|
| HDA – MFCC: (MFCC BASELINE) | 78.1% | – |
| HDA – PLP: (PLP BASELINE) | 79.0% | 4.1% |
| HDA – PLP+IFMean | 76.4% | −7.8% |
| MLP – MFCC: | 79.1% | 4.6% |
| MLP – PLP: | 79.8% | 7.8% |
| MLP – PLP+IFMean: | 80.6% | 11.4% |
| MLP – PLP+FMP: | 80.8% | 12.3% |

FIG. 6

SYSTEM AND METHOD OF USING NEURAL TRANSFORMS OF ROBUST AUDIO FEATURES FOR SPEECH PROCESSING

PRIORITY INFORMATION

The present application is a continuation of U.S. patent application Ser. No. 14/046,393, filed Oct. 4, 2013, the contents of which is incorporated herein by reference in its entirety.

FIELD OF THE DISCLOSURE

The present disclosure relates to speech processing and more particularly to a system and method of combining cepstral data and micro-modulation data via a non-linear multilayer perceptron for use in speech processing.

BACKGROUND

As introduced in recent years, great efforts have been focused on the task of continuous speech recognition (CSR), and significant advances in the state-of-the-art have been achieved. CSR is becoming a preferred user interface for mobile applications, often in "difficult" acoustic environments. One of the main challenges is the estimation and modeling of robust-to-noise speech features that can enhance the automatic speech recognition (ASR) performance in noisy environments.

In this context, many methods have been proposed for robust ASR feature extraction. These methods are distinguished into two large clusters: either extract noise-robust features or post-process the extracted features to suppress some of the noise introduced. Micro-modulation features capture the fine-grain formant frequency variations and are extremely robust-to-noise. It is also quite common to post-process features by smoothing, e.g. mean subtraction, variance normalization, and ARMA filtering (MVA) or RASTA filtering, and by feature transformations like heteroscedastic discriminant analysis (HDA) and/or maximum likelihood linear transform (MLLT). Especially this last scheme is widely adopted in most of state-of-the-art large vocabulary conversational speech recognition (LV-CSR) systems.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only exemplary embodiments of the disclosure and are not therefore to be considered to be limiting of its scope, the disclosure will be described and explained with additional specificity and detail through the use of the accompanying drawings in which:

FIG. 6 illustrates a table of word accuracy for a particular task; and

DETAILED DESCRIPTION

The following disclosure focuses on a neural network approach that combines robust modulation features with cepstral features to filter out noise. Prior to proceeding with the specific discussion with respect to the neural network approach, this disclosure presents the basic components, which can be utilized as part of the system embodiment that is disclosed. Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

This disclosure presents a novel method to combine the noise-robust modulation features with cepstral features and also to filter out some of the present noise. The final features outperform any single-stream features already used in real-life continuous speech recognition (CSR) applications. The features may or may not be cepstrum-based Although the acoustic information of the instantaneous formant frequencies is significant, it is not widely used in CSR systems. In fact, the scheme to optimally combine formant measurements at the feature domain is known to be critical, as the experimental results of this research also reveal.

As described below, two feature transformation methods for the integration of the formants measures with other features (Mel frequency cepstral coefficient (MFCC), perceptual linear predictive (PLP)) have been studied. These methods are: the linear HDA/MLLT transform and the non-linear bottle-neck neural network (hybrid MLP–HMM or tandem) approach. This disclosure describes the algorithm for measuring the micro-modulation formant-related audio features.

The adoption of the MLP-based transform is helpful because HDA/MLLT proves ineffective with the formant frequencies. The improvement with respect to the HDA transformation of MFCC's is larger (3.2% absolute, 15% relative). These results have been obtained on a real-life, open-vocabulary, mobile search task (Speak4it$^{SM}$). Similar results, up to 21% relative improvements, are also reported on the standard DARPA-WSJ task. This disclosure first turns to a general description of a system embodiment.

Figure 1:
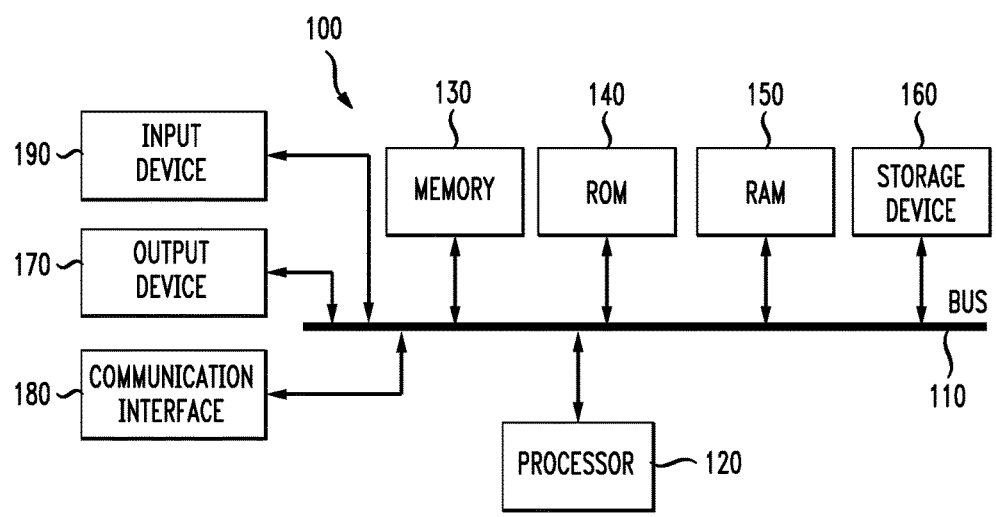
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the disclosure may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the disclosure operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Having discussed FIG. 1, this disclosure now turns to a more detailed description regarding the concept of providing a neural network approach that combines robust modulation features with cepstral features to filter out present noise. As shall be discussed in more detail next, the disclosure focuses on receiving a first information stream associated with speech in which the first information stream has micro-modulation features. A system also receives a second information stream associated with the speech, in which the second information stream has cepstral features. A point of this disclosure is the concept of combining via, a non-linear multi-layer perceptron, the first information stream and the second information stream to yield a third information stream that is then used to perform automatic speech recognition. Other uses of the third information stream can also be utilized such as for training Hidden Markov models as well as other training purposes.

A discriminative feature extraction technique known as heteroscedastic discriminant analysis (HDA) is applied. The following paper, incorporated herein by reference, provides background regarding applying HDA: N. Kumar and G. Andreou, "Heteroscedastic discriminant analysis and reduced rank HMMs for improved speech recognition," *Speech Communication*, Vol. 26, pp. 283-297, 1998. Given a number of recognition classes with arbitrary Gaussian distributions, the HDA transform provides features that maximize a ratio of between-class and within-class distortion measures. To minimize the loss of likelihood with diagonal covariance Gaussian mixture model (GMM) states, we also apply a maximum likelihood linear transform (MLLT). For simplicity, this disclosure refers to the joint application of the HDA and MLLT transforms as "HDA".

Figure 2:
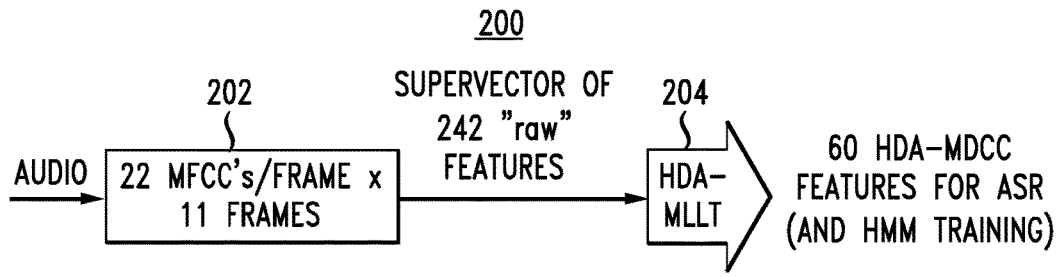
FIG. 2 illustrates feature extraction from MFCCs.

FIG. 2 depicts the application 200 of the HDA transform 204 to "super-vectors" of concatenated 202 11 consecutive frames (centered on the "current" frame) of MFCC (or PLP or other) "raw" acoustic features, to extract feature vectors of 60 dimensions for acoustic hidden Markov model (HMM) training and ASR decoding. CMS on the sentence level is applied to the raw acoustic features.

This disclosure next discusses a non-linear discriminative front-end. A hybrid speech recognition approach has been adopted, based on a multi-layer perceptron (MLP), and on a conventional HMM. Other approaches could be used as well. The MLP is configured as a non-linear feature extraction and dimensionality reduction mechanism to generate bottleneck features from the input raw acoustic features. Speech recognition is based on the conventional HMM, with context-dependent (triphones) Gaussian mixture model states of the bottle-neck feature vectors.

Figure 3:
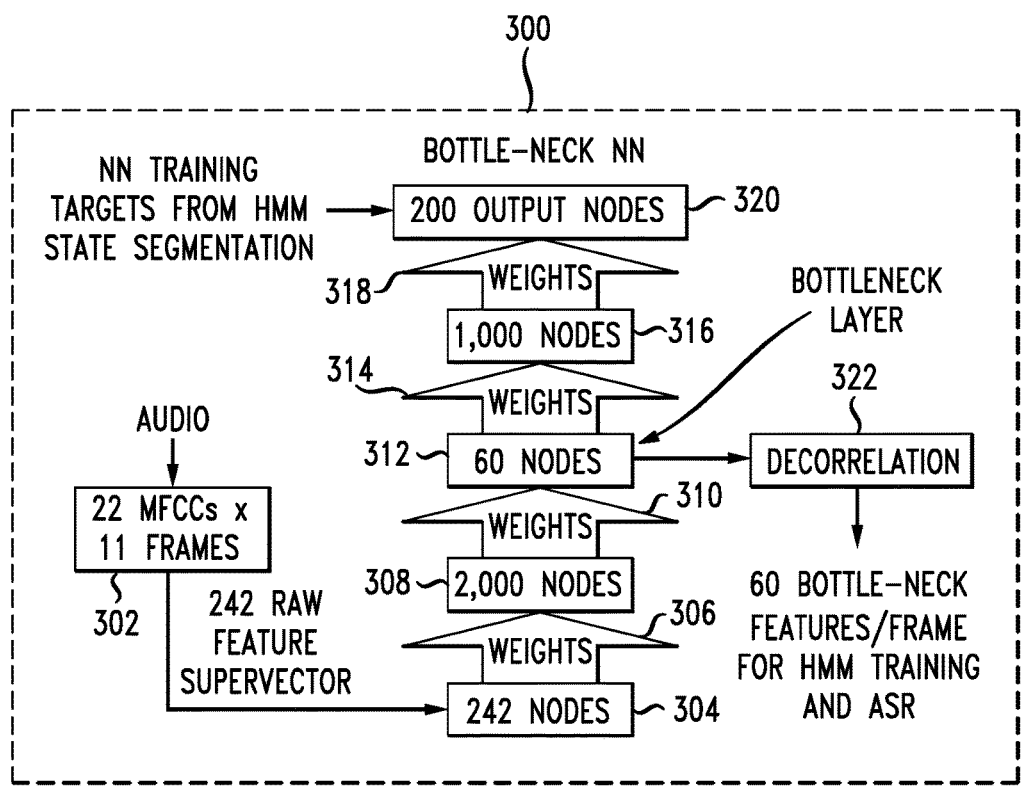
FIG. 3 illustrates a structure of a bottle neck multilayer perceptron.

The structure 300 of an exemplary MLP bottleneck component is shown in FIG. 3. Super-vectors of raw acoustic features (242 MFCC components (nodes) in feature 304 the Figure) are built by frame concatenation 302 similarly to the HDA transform. The global means and variances of the training data super-vector components are normalized to zero and unit values, respectively, before MLP training. The node activation functions are hyperbolic tangents, except for the softmax function at the output layer. During the MLP training, the targets of the output nodes are set according to the supervised state segmentation generated by an HMM recognizer, with the cross-entropy as training criterion. Weights 306 are provided to process the 242 nodes 204 into 2000 nodes 308, which then have weights 310 applied to the 200 nodes to yield the bottleneck layer of 60 nodes in feature 312.

After training, the MLP outputs give an estimate of the HMM state posteriors given the input raw features. Intuitively the "bottleneck" node-layer 312 (of dimension 60 in FIG. 3) provides a compact representation of the posterior probabilities: this motivates the adoption of the bottleneck node values (inputs of the node activation functions) as features for HMM training and recognition. The MLP training procedure is implemented using the BLAS library (i.e. "Basic Linear Algebra Subprograms" library) and multi-threading for computation speed. The MLP weights 306, 310, 314, 318 are estimated by iterative stochastic gradient descent with mini-batches of 300 vectors. The mini-batches are randomly created from the training corpus (the "epoch" being a single parameter training iteration on all the available training data. The training is terminated after 10 epochs. Other numbers of epochs may apply as well. The ASR accuracies have been checked with MLP's trained up to 50 epochs, and only small changes with respect to the results corresponding to the 10 epochs have been noticed. The learning rate can be optionally adjusted after every mini-batch weight update, according to the formula $$\frac{\eta}{1+\theta_t},$$

where t is the mini-batch index and $\eta$, $\theta$ are two constants defining the learning rate for the first and subsequent mini-batches, respectively. The value of $\theta$ equal to the reciprocal of the number of mini-batches in an epoch, works well in the applied applications.

Batch MLP training has also been experimented with by the resilient back-propagation method (iRPROP). There is a decorrelation step 322 that produces 60 bottle-neck features or frames for HMM training and ASR.

The micro-modulation features can provide information about the speech formant fine structure taking advantage of the excellent time resolution of the Energy Separation Algorithm (ESA). The complimentary to the cepstral features acoustic information that these micro-modulation features provide, is mainly focused on the instantaneous formant variations and on the transient speech phenomena. Herein, the regularized GaborESA algorithm is used for the demodulation process.

In more detail, the AM-FM speech model dictates that the formant frequencies are not constant during a single pitch period, but they can vary around a center frequency. These variations are partly captured by the micro-modulation mean frequency and bandwidth coefficients $F_i$, $B_i$ defined for the $i^{th}$ filter as, $$F_i = \frac{\int_0^T a_i^2(\tau) f_i^2(\tau) d\tau}{\int_0^T a_i^2(\tau) d\tau}$$

$$B_i^2 = \frac{\int_0^T [\dot{a}_i^2(\tau) + (f_i(\tau) - F_i)^2 a_i^2(\tau)] d\tau}{\int_0^T a_i^2(\tau) d\tau}$$

where $\alpha_i(t)$ and $f_i(t)$ are the instantaneous amplitude and frequency signals, i=1 . . . 6 is the filter index, and T the time window length. The instantaneous signal $\alpha a/i(t)$ is used as weight for the estimation of the $F_i$, $B_i$ coefficients, deemphasizing the contribution of $f_i(t)$ when the instantaneous amplitude signal takes smaller values (and thus, its estimates are not accurate enough). Finally, the coefficients are estimated over rolling 20 ms long windows with overlap of 10 ms (just like the cepstral features are estimated). These micro-modulation features model acoustic phenomena in a much different time-scale than the widely used Cepstral features. Consequently, a simple concatenation of these different features with the MFCC's or PLP's is far from optimal, causing some loss of acoustic information and eventually a degradation of the overall ASR performance. Herein, using the deep neural network (DNN) architecture to combine them is suggested, taking advantage of both the nonlinear relation between the different acoustic cues and the concatenated input vectors.

Two different features based on the estimated mean/bandwidth quantities could be used. The first feature set can be the "Instant. Frequency Means" (IFMean's), where the feature vector consists of the 6 $F_i$ coefficients, i.e. one coefficient per Gabor filter (using an 6-filter Gabor filterbank). The second feature set can consist of "Frequency Modulation Percentages" (FMP's) normalized bandwidth estimates, i.e. the $B_i/F_i$ coefficients. Experimentation shows that a 12 filter Gabor filterbank performs better than the 6-filter filterbank for the case of the FMP's. There are other configurations that could work as well.

The first feature set provides an estimate of the mean formant frequencies in a finer time-scale. The second one provides estimates of the normalized formant frequency variances.

To make valid comparisons between different frontends, this disclosure applies the same processing to different audio feature types: eleven consecutive frame vectors are concatenated into super-vectors. These are transformed (by HDA or MLP) (steps 304, 306, 308, 310, 312, 322) into 60 dimension feature vectors, used for HMM training and/or recognition. For a given ASR task, the triphonic HMM's are trained for different frontends with the same number of parameters and MLE procedure. The lexicon and language model have been kept the same for all of the examined features, to investigate only the impact of the frontend scheme upon the overall system performance. The examined raw feature types, prior to concatenation into super-vectors, are the following:

MFCC: 21 mel frequency cepstra, and frame energy and Super-vectors of 242 dimensions. PLP: perceptual linear prediction coefficients, and frame energy, optimized to a total of 16 coefficients per frame. Super-vectors of 176 dimensions.

PLP+IFMean: the PLP coefficients plus formant frequencies as discussed below, estimated over 6 bands, or 22 coefficients in total per frame. The Super-vectors are of 242 dimensions.

PLP+FMP: the PLP coefficients plus the normalized formant bandwidths (Section 3.2), estimated on 12 bands, or 28 coefficients per frame. Super-vectors are of 308 dimensions.

The ASR accuracy is measured on two different CSR tasks with different noise conditions and technical challenges, namely the DARPA Wall Street Journal (WSJ) and the Speak4it$^{SM}$ tasks.

Speaker-independent ASR experiments are performed on the DARPA WSJ corpus (downsampled to 8 kHz, in one example), using the Nov93-H1 and Nov93-H2 test sets, and the 3-gram language models built at MIT Lincoln Laboratories. The bottleneck MLP and the HMM are trained on the WSJ 284 speaker set.

For the baseline linear feature extraction, two HDA/MLLT matrices are used, namely, HDA estimated on a large collection of telephone band-width data and HDAWSJ estimated on the WSJ training data.

Figures 4, 5:
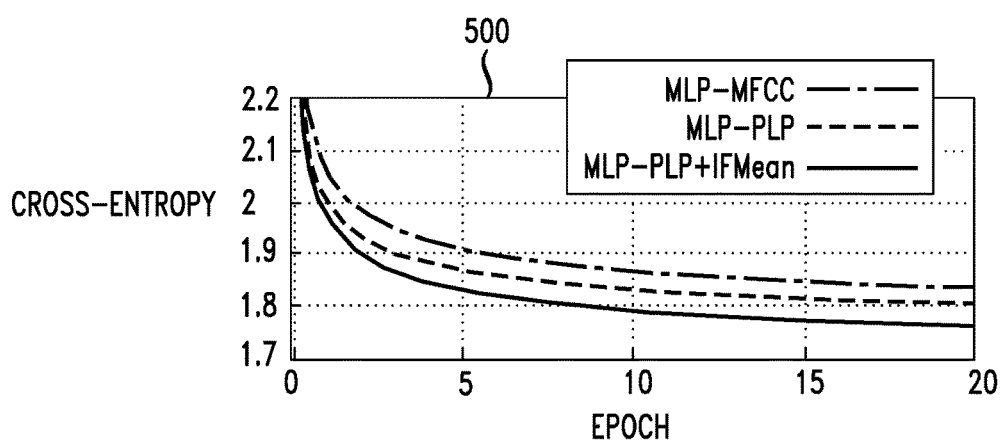
FIG. 4 illustrates a table of word accuracy for a "Wall Street Journal" task.
FIG. 5 illustrates a graph of cross-entropy vs. epoch for different features.

FIG. 4 shows a table 400 of the word accuracies for the two WSJ test sets, and the described frontends. The entries in the first column denote the frontend type, characterized by the transform type (i.e. MLP or HDA) and the respective, dash separated, super-vector of input audio raw features (e.g. MLP–PLP+IFMean).

The results shown in Table of FIG. 4 are obtained with MLP's trained by stochastic gradient descent. Batch iRPROP training has produced lower accuracies than stochastic training, even when using a larger number (up to 1,000) of epochs (compare MLP$_{iRROP}$–MFCC and MLP–MFCC in the Table).

The bottleneck MLP feature transform, when applied to the PLP's, (see HDA$_{WSJ}$–PLP vs. MLP–PLP) outperforms the HDA transform, with absolute word error rate reductions of 1.1% (8.3% relative) and 0.8% (13% relative) on the Nov93-H1 and the NOV93-H2, respectively (with larger gains, up to 18% relative, for the MFCC's). The integration of the formant frequencies with the PLP coefficients (see MLP–PLP+IFMEAN) further decreases the error rate by 1.8% and 1.3% absolute (14% and 21% relative), on the two test sets respectively.

Even if the MFCC's seem to perform slightly better than the PLP's on the WSJ task (clean speech, high SNR), the integration of the IFMean features with the MFCC's have not been tested. It is believed that the PLP's offer better performance than the MFCC's in noisy conditions and this disclosure focuses on improving the PLP performance by adding the micro-modulation features disclosed herein. In fact, on the noisier speech of the Speak4it task (next Section), the PLP's provide much better accuracy than the MFCC's.

More extensive tests of different feature types on the Speak4it$^{SM}$ application have been performed, concerning real-life voice search queries using mobile devices. A noise analysis of the database reveals that the corrupting noise is low-pass (on average) with an average SNR of 17 dB. The training and testing sets contain 337 k and 6.5 k sentences, respectively, with an average length of 2.5 words per sentence.

MLPs trained on different raw acoustic features have exactly the same structure (FIG. 3), except than the input node layer that must accommodate different super-vector dimensions, respectively. FIG. 5 shows the cross-entropy distortion (training data), versus the MLP training epoch 500. It is interesting to note that the PLP features obtain a lower distortion than the MFCC features, due to their smaller dimension (hence fewer MLP free parameters). The raw features PLP+IFMean, with the added formant frequencies (and same dimensions as the MFCC's), produce even lower distortion during training. Thus MFCC's, PLP's and PLP+IFMean's show increasingly better fits of the training data, respectively. This is mirrored in the ASR accuracy, even if, admittedly, there is no theoretical relationship between cross-entropy and accuracy.

After feature extraction, MLE HMM's of 19 k triphones, 8 k GMM states and 160 k Gaussians (60 dimensions), for all features sets, respectively, were trained.

The table 600 in FIG. 6 shows the word accuracy with either the MLP or HDA transforms of different audio features. In the Speak4it task the PLP's are overall more accurate than the MFCC's.

As already observed for the WSJ task, the MLP–MFCC is more accurate (by 1.0% absolute) than the HDA–MFCC, and the MLP–PLP is more accurate than HDA–PLP (by 0.8%). This confirms the improved performance of the non-linear MLP-based feature transformation scheme w.r.t. the HDA-based scheme. Additional 0.8%, and 1.0% improvements over MLP–PLP are obtained, respectively, by adding the IFMean features (MLPPLP+IFmean) and the FMP features (MLP–PLP+FMP). The MLP transformation of the combined PLP, IFMean and FMP features have not been tested at this stage.

It is noteworthy that the linear transform of the combined PLP and IFMean features (HDA–PLP+IFMean) reduces the accuracy w.r.t. HDA–PLP. Thus, the linear transform seems rather ineffective at the integration of different audio features, which is one of the motivations of this study of MLP-based transforms.

The overall error rate reduction from the baseline HAD–PLP to MLP–PLP+FMP is 1.8% absolute or 8.5% relative.

1.0% absolute (5% relative) is attributable to the use of the FMP features (compare MLP–PLP+FMP and MLP–PLP) as input to the MLP transform.

The experiments discussed above and summarized in FIGS. 4 and 6 are in part designed to compare the accuracy of the HDA/MLLT and MLP-based feature transforms. Therefore, input raw feature super-vectors were created by concatenating the same number (i.e. 11) of consecutive frames, and the same dimensionality (i.e. 60) was adopted for both the HDA output features and the MLP bottleneck features. This parametrization had been optimized for the HDA transform, and it is not optimal for the MLP system. Other number of consecutive frames and output dimensionality could be chosen as well.

Other MLP structures have been experimented with as well. For example, increasing the input supervector of MLPPLP+IFMean to 17 consecutive frames (instead of 11) has improved the accuracy to 81.3% (instead of 80.6% in FIG. 6).

Based on the various studies, the best error rate reduction (Speak4it task) with respect to the HDA–PLP baseline is 2.3% absolute (11% relative), and with respect to HDA–MFCC is 3.2% absolute (15% relative).

Figure 7:
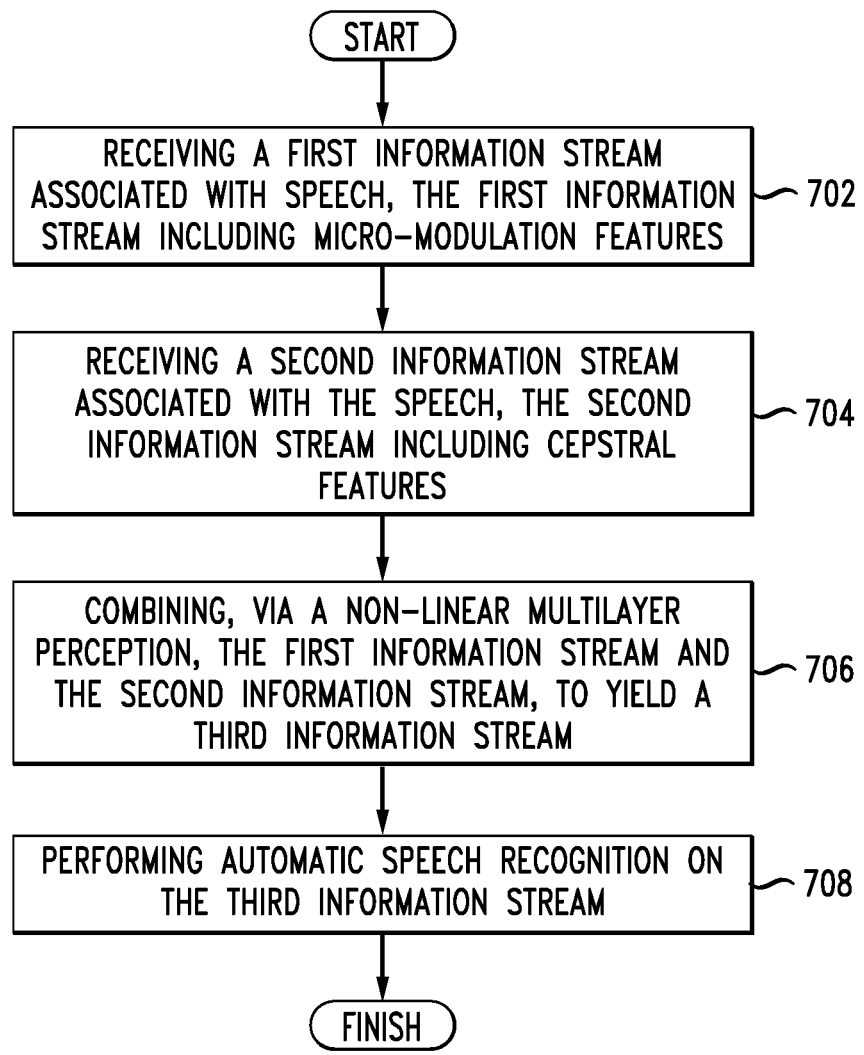
FIG. 7 illustrates a method embodiment associated with this disclosure.

A method embodiment of this disclosure is illustrated in FIG. 7. As is shown in FIG. 7, the method, which can be performed by a computing device or any other type of device, includes receiving a first information stream associated with speech, the first information stream including micro-modulation features (702). Next, the method includes receiving a second information stream associated with the speech, the second information stream including features (704). An example of the features could be cepstral features. The system then combines, via a non-linear multilayer perceptron, the first information stream and the second information stream, to yield a third information stream (706). Finally, the system performs automatic speech recognition on the third information stream (708).

The proposed ASR frontend reduces the absolute word error of the Speak4it$^{SM}$ voice-search task by 2.3% absolute (11% relative) w.r.t. to the HDA transform of PLP coefficients. The improvement with respect to the HDA transform of MFCC's is larger (3.2% absolute, or 15% relative). Large improvements, up to 21% relative, are also reported for the standard WSJ task. The Speak4it$^{SM}$ task is a real-life large-vocabulary voice-search application. The proposed frontend is based on:
  micro-modulation formant-related features, and
  non-linear MLP-based feature transform for the integration of micro-modulation and cepstral features (while linear transforms proved ineffective).

This disclosure relates to linear and non-linear MLP-based feature transformation methods for ASR. Prior work has not focused on the potential advantages of combining different types of audio features as input to the feature transformation process. On the contrary, this disclosure applies non-linear MLP feature transformations with the successful integration of spectral and formant measurements in a real-life large vocabulary voice-search Speak4it task. It has been shown that the MLP architecture can be successfully used to combine multiples of different features, keeping the non-trivial acoustic information. Previous work on the use of formant measures concerns small vocabulary tasks and uses separate information streams by combining their respective likelihoods. Instead, the method disclosed herein combines the different features into one stream, by bottleneck MLP transforms. This study also extends our previously published work on the Speak4it task.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. A computer-readable storage device, being a manufactured device that stores instructions for execution by a processor, expressly excludes transitory waves, energy, carrier signals, electromagnetic waves, and signals per se.

Although the above description may contain specific details, they should not be construed as limiting the claims in any way. Other configurations of the described embodiments of the disclosure are part of the scope of this disclosure. Accordingly, the appended claims and their legal equivalents should only define the scope of coverage, rather than any specific examples given.

We claim:

1. A method comprising:
   receiving, via a communication network, a first information stream associated with a formant frequency of speech, wherein the first information stream comprises micro-modulation features modeled in a first time scale;
   receiving, via the communication network, a second information stream associated with the speech;
   performing, via at least one hardware processor, automatic speech recognition on a third information stream formed by combining, via a non-linear multilayer perceptron, the first information stream and the second information stream, to yield a recognition result; and
   outputting, via the communication network, the recognition result comprising text representing the speech, the text being viewed on a display.

2. The method of claim 1, wherein the second information stream comprises cepstral features modeled in a second time scale.

3. The method of claim 2, wherein the first time scale is distinct from the second time scale.

4. The method of claim 1, further comprising filtering out noise from the third information stream prior to performing automatic speech recognition.

5. The method of claim 1, wherein the third information stream comprises less features than raw features in the first information stream and the second information stream.

6. The method of claim 1, further comprising training a Hidden Markov model using the third information stream.

7. A system comprising:
   a processor; and
   a non-transitory computer-readable storage medium storing instructions which, when executed by the processor, cause the processor to perform operations comprising:
   receiving, via a communication network, a first information stream associated with a formant frequency of speech, wherein the first information stream comprises micro-modulation features modeled in a first time scale;
   receiving, via the communication network, a second information stream associated with the speech;
   performing, via at least one hardware processor, automatic speech recognition on a third information stream formed by combining, via a non-linear multilayer perceptron, the first information stream and the second information stream to yield a recognition result; and
   outputting, via the communication network, the recognition result comprising text representing the speech, the text being viewed on a display.

8. The system of claim 7, wherein the second information stream comprises cepstral features modeled in a second time scale.

9. The system of claim 8, wherein the first time scale is distinct from the second time scale.

10. The system of claim 7, wherein the non-transitory computer-readable storage medium stores further instructions which, when executed by the processor, cause the processor to perform further operations comprising filtering out noise from the third information stream prior to performing automatic speech recognition.

11. The system of claim 7, wherein the third information stream comprises less features than raw features in the first information stream and the second information stream.

12. The system of claim 7, wherein the non-transitory computer-readable storage medium stores further instructions which, when executed by the processor, cause the processor to perform further operations comprising training a Hidden Markov model using the third information stream.

13. A non-transitory computer-readable storage device storing instructions, which, when executed by a processor, cause the processor to perform operations comprising:

receiving, via a communication network, a first information stream associated with a formant frequency of speech, wherein the first information stream comprises micro-modulation features modeled in a first time scale;

receiving, via the communication network, a second information stream associated with the speech;

performing, via at least one hardware processor, automatic speech recognition on a third information stream formed by combining, via a non-linear multilayer perceptron, the first information stream and the second information stream to yield a recognition result; and outputting, via the communication network, the recognition result comprising text representing the speech, the text being viewed on a display.

14. The non-transitory computer-readable storage device of claim 13, wherein the second information stream comprises cepstral features modeled in a second time scale.

15. The non-transitory computer-readable storage device of claim 14, wherein the first time scale is distinct from the second time scale.

16. The non-transitory computer-readable storage device of claim 14, wherein the third information stream comprises less features than raw features in the first information stream and the second information stream.

17. The non-transitory computer-readable storage device of claim 14, wherein the computer-readable storage device stores further instructions which, when executed by the processor, cause the processor to perform further operations comprising training a Hidden Markov model using the third information stream.

* * * * *